(12) United States Patent
Dettling et al.

(10) Patent No.: US 11,130,530 B2
(45) Date of Patent: Sep. 28, 2021

(54) LOAD-BEARING STRUCTURAL

(71) Applicants: GF CASTING SOLUTIONS ALTENMARKT GMBH & CO. KG, St. Gallen (AT); GF CASTING SOLUTIONS HERZOGENBURG HPDC GMBH, Herzogenburg (AT); GF CASTING SOLUTIONS WERDOHL GMBH, Werdohl (DE); GF CASTING SOLUTIONS SUZHOU CO., LTD., Suzhou (CN)

(72) Inventors: Michael Dettling, Villingen-Schwenningen (DE); Stephan Philipp, Gailingen (DE); Christophe Buch, Stockach (DE); Edouard Girault, Marcilly sur Eure (FR); Julien Carrie, Versailles (FR)

(73) Assignees: GF CASTING SOLUTIONS ALTENMARKT GMBH & CO. KG; GF CASTING SOLUTIONS HERZOGENBURG HPDC GMBH; GF CASTING SOLUTIONS WERDOHL GMBH; GF CASTING SOLUTIONS SUZHOU CO., LTD.

( * ) Notice: Subject to any disclaimer, the term of this patent is extended or adjusted under 35 U.S.C. 154(b) by 0 days.

(21) Appl. No.: 16/320,620

(22) PCT Filed: Jul. 11, 2017

(86) PCT No.: PCT/EP2017/067436
§ 371 (c)(1),
(2) Date: Jan. 25, 2019

(87) PCT Pub. No.: WO2018/019577
PCT Pub. Date: Feb. 1, 2018

(65) Prior Publication Data
US 2019/0161126 A1 May 30, 2019

(30) Foreign Application Priority Data

Jul. 28, 2016 (EP) .................................. 16181590

(51) Int. Cl.
*B62D 25/08* (2006.01)
*B60K 5/12* (2006.01)
*B62D 29/00* (2006.01)

(52) U.S. Cl.
CPC .............. *B62D 25/088* (2013.01); *B60K 5/12* (2013.01); *B62D 29/008* (2013.01)

(58) Field of Classification Search
CPC ....... B62D 25/088; B62D 29/008; B60K 5/12
(Continued)

(56) References Cited

U.S. PATENT DOCUMENTS

2005/0236827 A1* 10/2005 Mouch .................. B62D 21/11
  280/788
2016/0129747 A1*  5/2016 Mildner ............... B62D 25/088
  280/124.155

(Continued)

FOREIGN PATENT DOCUMENTS

| DE | 102009015637 A1 | 10/2010 |
| WO | WO-2011104449 A1 | 9/2011 |
| WO | WO-2015063569 A1 | 5/2015 |

OTHER PUBLICATIONS

International Search Report and Written Opinion issued in PCT/EP2017/067436, dated Sep. 28, 2017; ISA/EP.

*Primary Examiner* — D Glenn Dayoan
*Assistant Examiner* — E Turner Hicks
(74) *Attorney, Agent, or Firm* — Harness, Dickey & Pierce, P.L.C.

(57) ABSTRACT

Load-bearing structural component (1) in particular of a motor vehicle including a strut-dome (2) to hold the strut and an engine support (3) to fasten an engine wherein the
(Continued)

Figure 1:
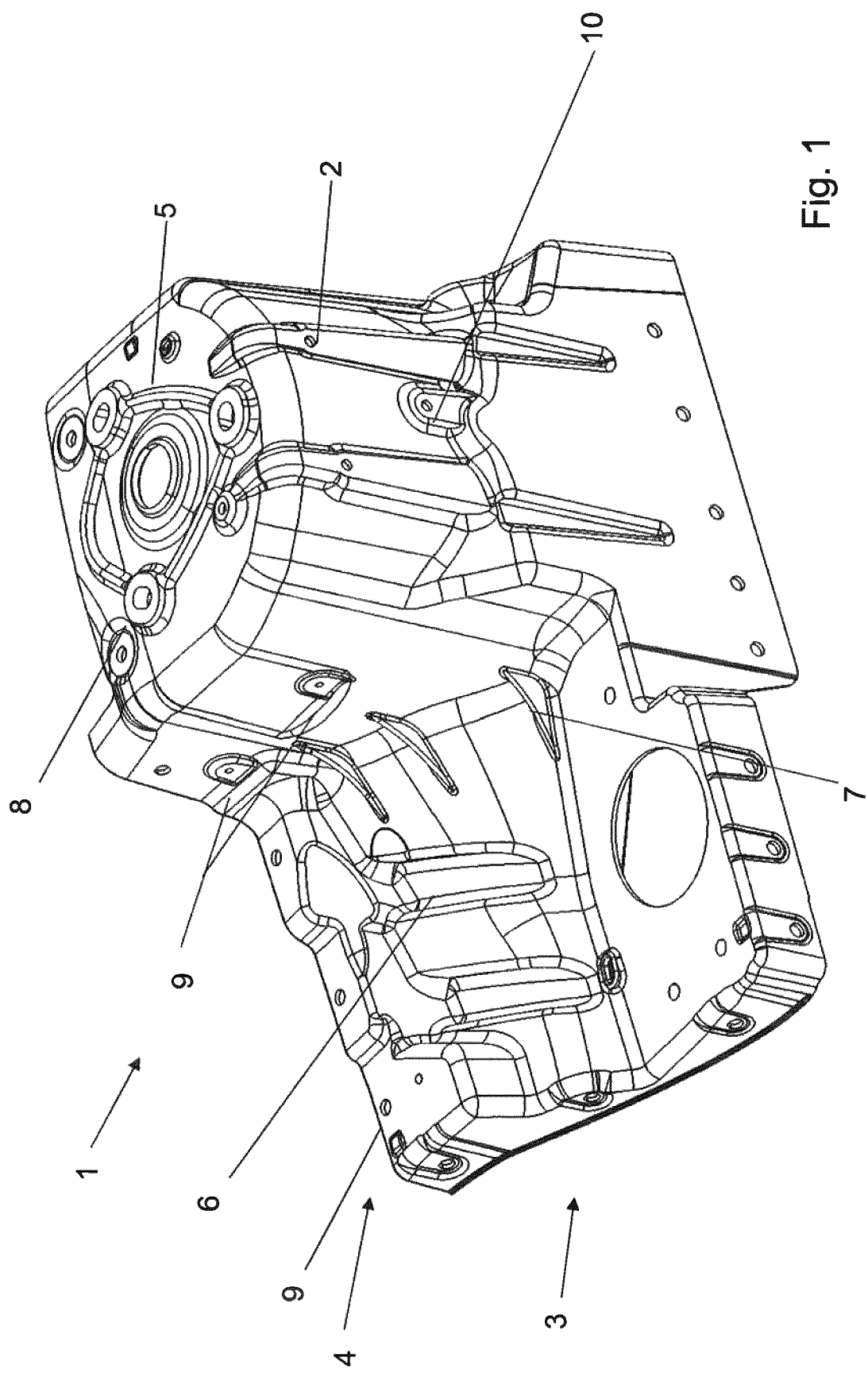

load-bearing structural component (1) is formed in one-piece as a single part.

10 Claims, 2 Drawing Sheets

(58) Field of Classification Search
USPC .............................. 296/203.02, 29, 198, 30
See application file for complete search history.

(56) References Cited

U.S. PATENT DOCUMENTS

| | | | |
|---|---|---|---|
| 2016/0159399 A1* | 6/2016 | Yasuhara | B62D 25/082 |
| | | | 180/292 |
| 2016/0244103 A1* | 8/2016 | Amemiya | B62D 21/00 |
| 2016/0264176 A1* | 9/2016 | Balzer | B62D 25/088 |
| 2017/0008569 A1* | 1/2017 | Hofmann | B62D 25/088 |
| 2018/0029649 A1* | 2/2018 | Maruyama | B62D 21/02 |

\* cited by examiner

LOAD-BEARING STRUCTURAL

CROSS-REFERENCE TO RELATED APPLICATIONS

This application is a 371 U.S. National Stage of International Application No. PCT/EP2017/067436, filed Jul. 11, 2017 and published in English as WO 2018/019577 A1 on Feb. 1, 2018, which claims the benefit of European Patent Application No. 16181590.7, filed on Jul. 28, 2016. The disclosures of the above-identified applications are incorporated herein by reference.

The invention relates to a load-bearing structural component in particular of a motor vehicle including a strut-dome to holding of the strut and an engine support to fasten an engine.

Load-bearing structural components must have a lowest possible weight nevertheless they should have the required stability and stiffness to be able to provide optimal protection to passengers and pedestrians. A further aspect is to protect the components against premature corrosion and ageing process.

WO 2011/104449 A1 discloses a front portion of a vehicle structure including a wheel housing and a suspension support with an improved rigidity wherein the front portion including walls which are welded together.

The disadvantages of this vehicle structure are the high producing time and the high producing cost due to the welding process.

It is the object of the invention to propose a device that is inexpensive to manufacture and has a comparatively low weight with an improved stiffness.

This object is achieved according to the invention in that the load-bearing structural component is formed as one single part respectively one-piece.

The inventive load-bearing structural component includes a strut-dome to hold the strut. The strut-dome has a suspension bracket on which the strut is fixed. The suspension bracket includes fixing points to assembling of the strut. Due to the thin wall thickness of the strut-dome respectively to the suspension bracket are fixing points cast-on. The fixing points have broader respectively thicker wall thickness than the strut-dome respectively the suspension bracket to increase the strength in the area of the fixing points.

The inventive load-bearing structural component includes an engine support receptive to fasten an engine. The engine support and the strut-dome are one-piece.

Preferably, the load-bearing structural component respectively the engine support includes a water-tank support. That means, the load-bearing structural component includes a strut-dome, with a suspension bracket and an engine support preferably with a water-tank support and is fabricated in a single piece, which reduces the producing time because time-consuming producing steps as welding of separate walls can be avoided.

Preferably, the inventive load-bearing structural component is a cast part, whereby the producing of different parts and the following welding process of them can be avoided. This allows an economical manufacture.

Advantageous the load-bearing structural component is made in light metal alloy preferably in aluminum- or magnesium alloy. This brings the advantage of a light part with enough stiffness and strength. Furthermore there is no problem with corrosion at contact surfaces at mounted parts.

To increasing the stiffness of the load-bearing structural component are grooves applied on it, preferably in the area of the engine support.

In a preferred embodiment has the load-bearing structural component reinforcing ribs to support the load-bearing structural component in the main load carrying area. The reinforcing ribs are arranged in the transition area between the strut-dome and the engine support in a preferred embodiment.

In a further embodiment are reinforcing ribs on the bottom side of the engine support arranged to increase the stiffness and to improve the load ability. There can be also mounting points which allow mounting motor parts directly on the engine support.

A further advantage of the invented load-bearing structural component are the integrated mounting points which allow assembling further motor components like water-tank directly on the load-bearing structural component without welding of further reinforcement parts or sheets.

Figure 2:
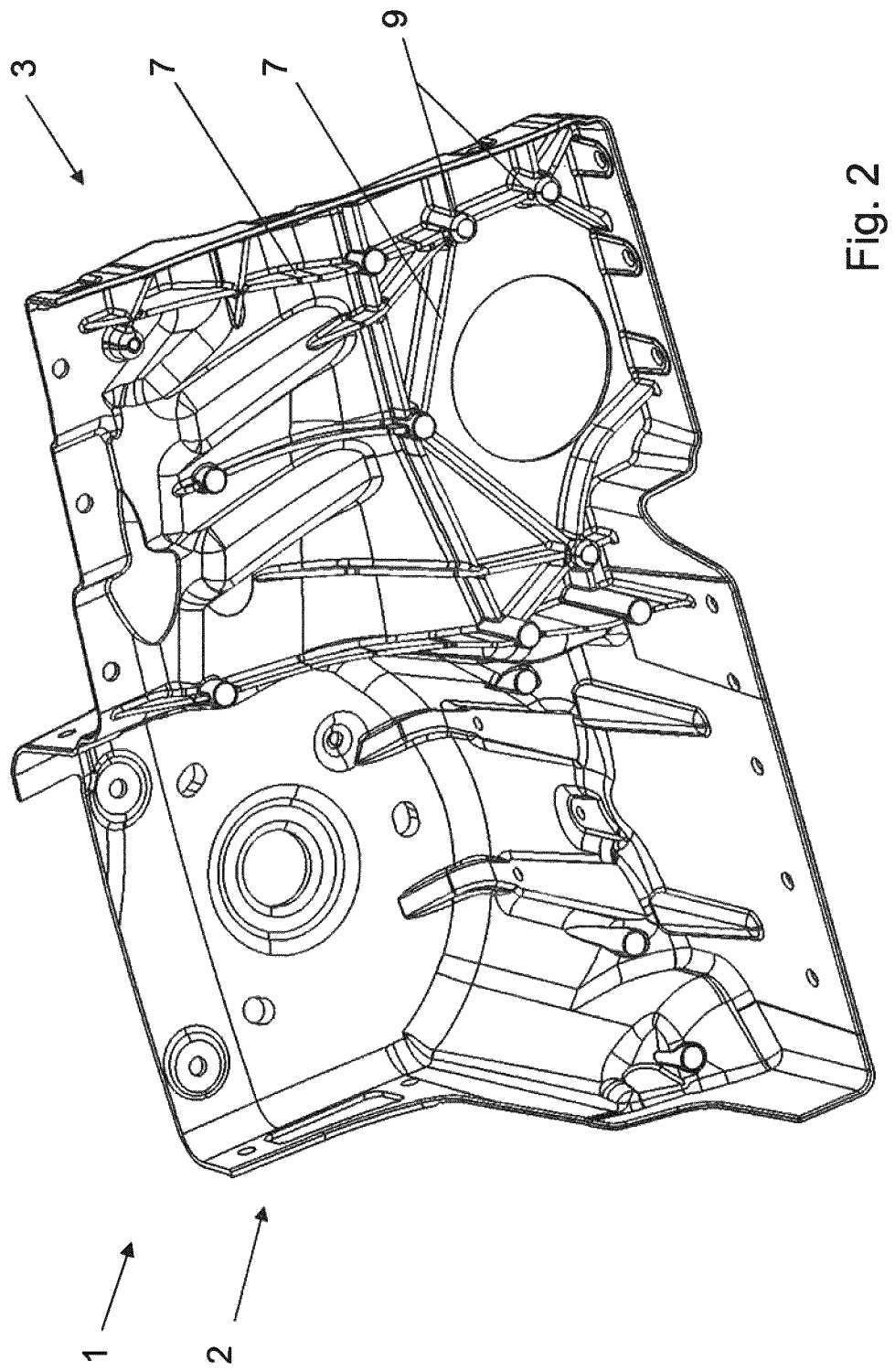

An exemplary embodiment of the invention is described by way of the Figures, the invention not being restricted to only the exemplary embodiment, in which:

FIG. 1 shows a three-dimensional view of the invented load-bearing structural component from the upper side and FIG. 2 shows a three-dimensional view of the invented load-bearing structural component from the bottom side.

FIG. 1 shows a three-dimensional view of the invented load-bearing structural component (1) from the upper side. The load-bearing structural component (1) includes a strut-dome (2) which holds the strut (not shown) and an engine support (3) to mount an engine on it. The load-bearing structural component (1) is a single part that means the engine support (3) and the strut-dome is one piece.

The strut-dome (2) has a suspension bracket (5) which has fixing points (8) to assembly the strut. Because of the thin wall thickness of the load-bearing structural component (1) are the fixing points (8) in their cross section thicker to get enough strength.

The load-bearing structural component (1) is a cast part. Preferably, the load-bearing structural component (1) is made of light metal alloy because of the weight reducing and the avoiding of corrosion; to prefer is aluminum- or also magnesium alloy but others are also possible.

As shown in FIG. 1 the load-bearing structural component (1) has reinforcing ribs (7) to support respectively to reinforce the area with the highest load which is given by the geometry of the load-bearing structural component (1). The reinforcing ribs (7) are placed between the strut-dome (2) and the engine support (3) to reinforce the transition area.

A further possibility to reinforce the load-bearing structural component (1) is the arrangement of grooves (6) in the cast part. These moulded grooves (6) respectively channels generate a kind of ribbing in the load-bearing structural component (1) which increase the stiffness of the part. Preferably are the grooves (6) arranged in the engine support (3).

The load-bearing structural component (1) has mounting points (9),(10) for the assembly of further motor parts like a water-tank and others on it. The benefit of the mounting points (9) is that they are included in the cast part, preferably to fix the additional motor parts directly on the load-bearing structural component (1) without further required sheets.

FIG. 2 shows the bottom of the load-bearing structural component (1). The reinforcing ribs (7) support the load behavior of the load-bearing structural component (1) especially at the engine support (3). The load becomes a better distribution on the engine support (3). Furthermore there are also mounting points (7) placed to fix motor parts.

REFERENCE NUMBERS 1 load-bearing structural component
2 strut-dome 3 engine support
4 water-tank support
5 suspension bracket
6 groove
7 reinforcing ribs
8 fixing points
9 mounting points
10 mounting points

The invention claimed is:

1. Load-bearing structural component for a motor vehicle comprising a strut-dome for holding of a strut and an engine support to fasten an engine wherein the load-bearing structural component is formed as one-piece, and the load-bearing structural component having grooves to increase the stiffness.

2. Load-bearing structural component according to claim 1, wherein the engine support includes a water-tank support.

3. Load-bearing structural component according to claim 1, wherein the load-bearing structural component is a cast part.

4. Load-bearing structural component according to claim 1, wherein the load-bearing structural component is made of light metal alloy.

5. Load-bearing structural component according to claim 1, wherein the load-bearing structural component has reinforcing ribs in a transition area between the strut-dome and the engine support.

6. Load-bearing structural component according to claim 1, wherein reinforcing ribs are arranged on the bottom side of the engine support.

7. Load-bearing structural component according to claim 1, wherein the grooves are in the engine support and run vertically.

8. Load-bearing structural component according to claim 7, wherein the grooves are arranged on the engine support.

9. Load-bearing structural component according to claim 1, wherein the load-bearing structural component has integrated mounting points.

10. A load bearing structural component for a motor vehicle comprising:
    an integrally formed cast member including all of the following:
    a raised dome having a generally flat upper surface;
    a plurality of mounting structures on the flat surface of the dome having increased thicknesses configured to receive a strut;
    an engine support portion of lesser height than the dome;
    a wall of the dome transitioning between the flat upper surface of the dome and the engine support portion;
    at least one support on the wall configure to mount a water tank; and
    reinforcing ribs on an underside of the engine support portion.

* * * * *